United States Patent
Vaswani et al.

(10) Patent No.: US 12,292,977 B2
(45) Date of Patent: May 6, 2025

(54) ATTESTING UPDATE OF A FIRMWARE LAYER

(71) Applicant: Microsoft Technology Licensing, LLC, Redmond, WA (US)

(72) Inventors: Kapil Vaswani, Cambridge (GB); Cédric Alain Marie Fournet, Cambridge (GB); Stavros Volos, Cambridge (GB)

(73) Assignee: Microsoft Technology Licensing, LLC., Redmond, WA (US)

( * ) Notice: Subject to any disclaimer, the term of this patent is extended or adjusted under 35 U.S.C. 154(b) by 441 days.

(21) Appl. No.: 17/148,548

(22) Filed: Jan. 13, 2021

(65) Prior Publication Data
US 2022/0222348 A1 Jul. 14, 2022

(30) Foreign Application Priority Data
Dec. 17, 2020 (GB) ...................................... 2020059

(51) Int. Cl.
*G06F 21/57* (2013.01)
*H04L 9/08* (2006.01)
(Continued)

(52) U.S. Cl.
CPC .......... *G06F 21/572* (2013.01); *H04L 9/0825* (2013.01); *H04L 9/0838* (2013.01);
(Continued)

(58) Field of Classification Search
CPC ........ G06F 21/572; G06F 21/44; G06F 21/64; G06F 8/65; H04L 9/0866; H04L 9/3268
See application file for complete search history.

(56) References Cited

U.S. PATENT DOCUMENTS 8,041,957 B2 * 10/2011 Michaelis ............... G06F 21/51
713/188
8,856,941 B2 * 10/2014 Cha .......................... G06F 21/57
726/26

(Continued)

FOREIGN PATENT DOCUMENTS

CN 109492352 A 3/2019
EP 3637297 A1 4/2020

OTHER PUBLICATIONS

"International Search Report and Written Opinion Issued in PCT Application No. PCT/US21/059340", Mailed Date: Feb. 28, 2022, 11 Pages.

(Continued)

*Primary Examiner* — Zachary A. Davis
(74) *Attorney, Agent, or Firm* — Barta Jones, PLLC (57) ABSTRACT

In various examples, there is a method of enabling an attestable update of a firmware layer that provides a unique identity of a computing device. An immutable firmware layer is used to access a unique device secret. The immutable layer is used to derive a hardware device identity (HDI) from the unique device secret. The immutable layer is used to derive a compound device identity (CDI) from a measurement of the firmware layer and the unique device secret. The CDI and HDI are made available to the firmware layer. The firmware layer is used to issue a local certificate to endorse a device identity key, derived from the CDI, the local certificate signed by a key derived from the HDI.

20 Claims, 6 Drawing Sheets

(51) Int. Cl.
*H04L 9/30* (2006.01)
*H04L 9/32* (2006.01)

(52) U.S. Cl.
CPC ......... *H04L 9/0866* (2013.01); *H04L 9/3073* (2013.01); *H04L 9/3268* (2013.01); *G06F 2221/033* (2013.01)

(56) References Cited

U.S. PATENT DOCUMENTS

| | | | |
|---|---|---|---|
| 9,830,099 B1* | 11/2017 | Johansson | G06F 3/0623 |
| 10,771,264 B2* | 9/2020 | Edwards | G06F 21/572 |
| 11,425,111 B2* | 8/2022 | Smith | G06F 21/74 |
| 11,601,268 B2* | 3/2023 | Hershman | H04L 9/3265 |
| 11,811,743 B2* | 11/2023 | Shiner | G06F 8/65 |
| 2020/0193065 A1* | 6/2020 | Smith | H04L 9/3242 |
| 2021/0176056 A1* | 6/2021 | Cai | G06F 21/57 |

OTHER PUBLICATIONS

Decision to grant a European patent pursuant to Article 97(1) Received for European Application No. 21827254.0, mailed on Aug. 8, 2024, 2 pages.
Communication 71(3) Received for European Application No. 21827254.0, mailed on Apr. 15, 2024, 9 pages.

* cited by examiner

ATTESTING UPDATE OF A FIRMWARE LAYER

CROSS-REFERENCE TO RELATED APPLICATIONS

This non-provisional utility application claims priority to UK patent application number 2020059.8 entitled "ATTESTING UPDATE OF A FIRMWARE LAYER" and filed on 17 Dec. 2020, which is incorporated herein in its entirety by reference.

BACKGROUND

In some types of computing devices the identity of the computing device is known from a unique device secret (UDS), which is a cryptographic public-private key pair, or a random number, burnt into the computing device hardware during manufacture. The unique device secret is useful to enable the computing device to create keys and certificates which attest to particular firmware on the computing device. In an example, a software application which uses the computing device wishes to confirm that the computing device has particular firmware installed, for security reasons. The software application wishes to receive an attestation that the firmware installed on the computing device is as expected, such as by verifying the identity of the firmware using a certificate chain. The computing device hardware is able to use the unique device secret to generate one or more public-private key pairs along with the corresponding certificates which are used by the software application to verify the firmware on the computing device.

Updates to firmware layers of computing devices are used in practice to fix bugs, to carry out maintenance and for deploying upgrades. However, enabling attestation of the updated firmware is not straightforward.

The embodiments described below are not limited to implementations which solve any or all of the disadvantages of known ways of attesting update of a firmware layer.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

In various examples there is a method of enabling an attestable update of a firmware layer that provides a unique identity of a computing device. The method comprises using an immutable firmware layer to access a unique device secret. The immutable firmware layer is used to derive a hardware device identity (HDI) from the unique device secret. The immutable firmware layer is used to derive a compound device identity (CDI) from a measurement of the firmware layer and the unique device secret. The CDI and HDI are made available to the firmware layer. The firmware layer is used to issue a local certificate to endorse a device identity key, derived from the CDI, the local certificate signed by a key derived from the HDI. The unique device secret is unique among a plurality of devices.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present examples are constructed or utilized. The description sets forth the functions of the examples and the sequence of operations for constructing and operating the examples. However, the same or equivalent functions and sequences may be accomplished by different examples Various embodiments are described which enable attestation of firmware at a computing device. In many cases the computing device is a peripheral device such as a graphics processing unit, field-programmable gate array (FPGA), application-specific integrated circuit, cryptographic accelerator, video processing unit, regular expression accelerator, data compression accelerator, artificial intelligence accelerator or other device used to complement a central processing unit (CPU). The CPU is part of functionality at a host computing device. Peripheral devices which comprise computer hardware to perform functions more efficiently than is possible in software running on a general-purpose CPU are often very useful units, separate from the CPU which act as hardware accelerators. Typically these types of peripheral device improve the execution of specific types of algorithm by allowing greater concurrency.

Increasingly there is a desire to work with sensitive code and or sensitive data and to retain security and privacy. Often large amounts of sensitive code and/or data are to be processed using resource intensive algorithms and peripheral devices are an option to improve efficiency in such situations.

Where security and privacy are important, there is often a desire for one or more applications to be able to receive and verify an attestation from the peripheral device in order to know that the firmware on the peripheral device is as expected. For example, the firmware on the peripheral device is configured to enforce a trusted execution environment on the peripheral device and a verifier wants to know that the firmware on the peripheral device is correct and has not been tampered with or replaced by a malicious party. The verifier is an application which verifies the attestation. The verifier is at any computing element which is able to communicate with the host. In some cases the verifier is an application which is part of another service running on a server separate from the host and in communication with the host over any suitable communications network. A user relies on a trusted system to implement the verifier and verify the attestation and in some cases the host computing device is not trusted.

Figure 1:
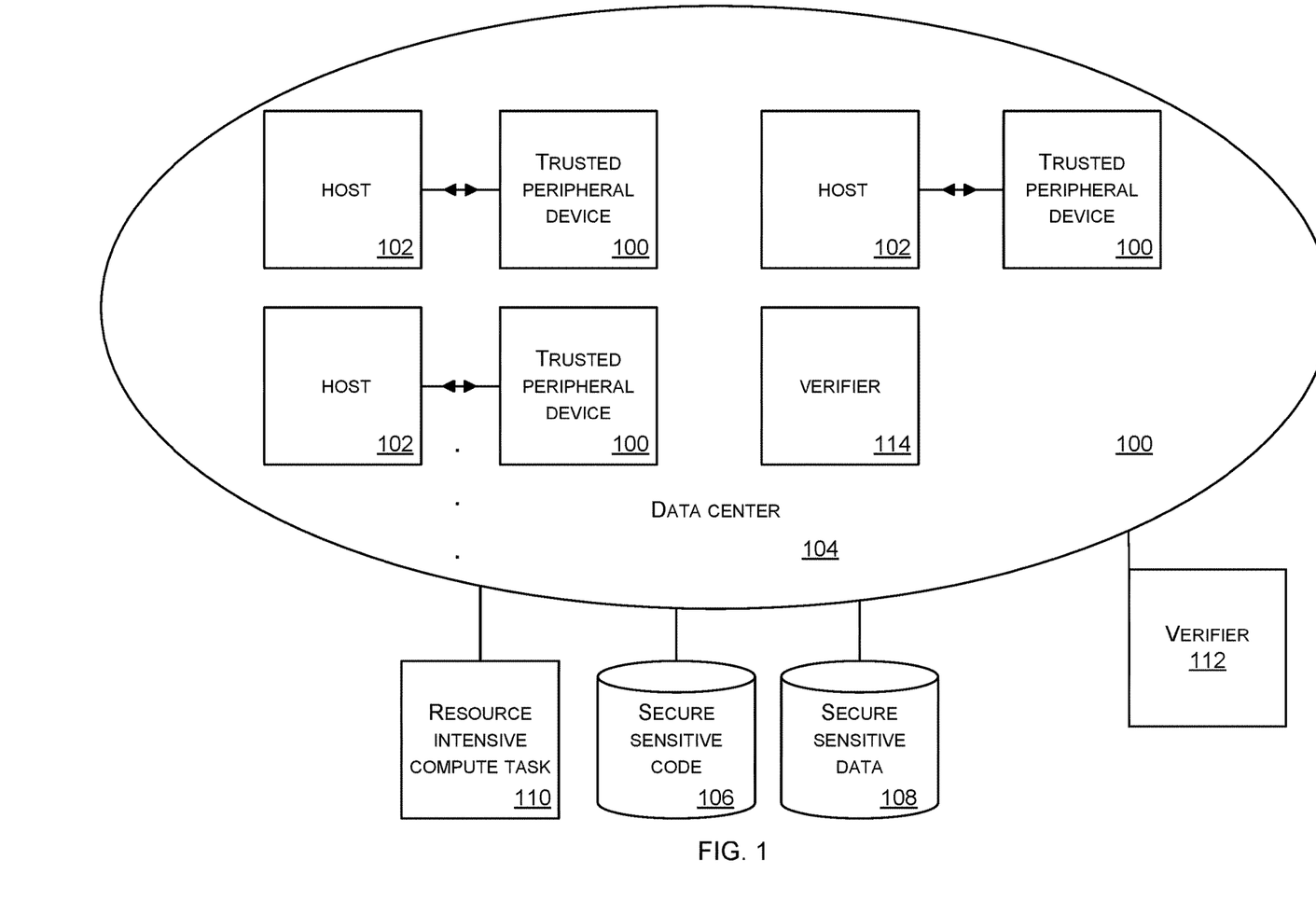
FIG. 1 is a schematic diagram of a data center comprising host computing devices with trusted peripheral devices.

FIG. 1 is a schematic diagram of a data center 104 comprising a plurality of host computing devices 102. Individual ones of the host computing devices 102 are connected to trusted peripheral devices 100. The host computing devices 102 are interconnected using communications links which are not shown in FIG. 1 for clarity and the resulting network may include one or more computing devices which have no peripheral devices. Suppose the data center 104 is used to execute a resource intensive compute task 110 using sensitive code 106 and sensitive data 108. The data center 104 is able to distribute the resource intensive compute task amongst various user runtime processes at the hosts 102. The trusted peripheral devices 100 are able to execute computations, in efficient ways making use of parallelization, and to do this in a way which is secure even though the hosts 102 may be untrusted and even though other unsecure processes are executing in the data center at the same time. In a few years it is expected that a majority of compute cycles in public clouds will be contributed by peripheral devices such as accelerators. In FIG. 1 a first verifier 112 is depicted outside the data center 104 and a second verifier 114 is depicted inside the data center 104. In practice, there are many verifiers either inside or outside the data center. In FIG. 1 the first verifier 112 is an application at a server which is in communication with the data center 104 via any communications network. For example, the first verifier 112 is a on-premise machine at an enterprise within the enterprise trusted boundary. For example, the second verifier 114 is a trusted service that runs in a trusted execution environment in the data center 104.

FIG. 1 illustrates the situation for a data center. However, it is also possible to use a host 102 and trusted peripheral device 100 in stand-alone situations or in other types of deployment.

Suppose that each of the peripheral devices in FIG. 1 has sent a certificate to one of the two verifiers 112, 114 so that a verifier is able to verify that firmware on the peripheral device is as expected. A peripheral device generates a certificate for a public part of a key. The peripheral device derives the key using the unique device identifier of the peripheral device (where the unique device identifier is unique among devices) and a measurement of a firmware layer of the peripheral device. The certificate is referred to as a local certificate because it is generated by the peripheral device rather than a certificate authority of the manufacturer. The firmware layer that is measured to generate the key, and which generates the local certificate, is referred to as a firmware layer which provides a unique identity of the peripheral device. In an example, the firmware layer which provides a unique identity of the peripheral device is a RIoT core as explained below.

The firmware layer of the peripheral device, which provides the unique identity of the peripheral device, is mutable and suppose it is modified as a result of a firmware upgrade of the peripheral device. A local certificate previously generated is no longer workable to attest the firmware on the peripheral device since the measurement of the upgraded firmware layer will be different from the measurement of the original firmware layer.

The situation mentioned above occurs for any computing device where device identity and attestation is handled using the Device Identifier Composition Engine (DICE) standard of the Trusted Computing Group (TCG). DICE is a standardized method to create secret keys to be used by devices for authentication, attestation, data encryption and other purposes. DICE is typically implemented in hardware or read only memory (ROM)-based firmware. Robust Internet of Things (RIoT) is a family of protocols for using DICE-derived secrets. RIoT includes protocols for device attestation whereby there is secure reporting of the firmware that booted on a computing device. More detail about DICE and RIoT are given below with reference to FIG. 3.

Various approaches for dealing with the problem of the local certificate being unworkable after a change to the firmware are considered.

One approach involves making the firmware layer from which the measurement is taken to generate the local certificate immutable for the lifetime of the device. This is implemented by storing (a hash of) the firmware layer in ROM, or by ensuring that the manufacturer issues device identity certificates for a single version of the firmware layer. In either case, updates to the firmware layer are not supported. With this approach it is best to keep the firmware layer as small and simple as possible since it cannot be upgraded. This approach is inflexible and does not enable updates to the firmware layer.

Another approach is to exclude the firmware layer from the measurement used to create the local certificate. This allows the firmware layer to be updated without changing device identity. However, it places a lot of trust in the manufacturer of the computing device, who may use an update mechanism to add backdoors after a device has been deployed. This approach is not satisfactory from a security perspective.

Another approach is for the manufacturer to issue a fresh certificate for every deployed device. However, this approach is only workable where the unique device secret is known to the manufacturer. This approach places a lot of administrative burden on the manufacturer. The approach also relies on trust in the manufacturer to keep information about the deployed devices secret.

Another approach is re-certification. In this approach device owners collect requests from the deployed devices for public device identity. The device owners then request the manufacturer to issue fresh certificates for the devices to use to attest their firmware. In confidential computing scenarios, where the device owner is not trusted, an appropriate authentication mechanism is needed to ensure that the manufacturer only signs appropriate keys. This approach introduces complexity and delays.

The inventors devised a way for the local certificate to be workable even after a change to the firmware layer which provides the device identity. In various examples described herein an immutable firmware layer is used to generate an additional secret referred to as Hardware Device Identity (HDI) which is not salted by the measurement of the firmware layer. The HDI remains constant despite firmware updates to the device and is used to enable firmware updates to take place in a manner so that the firmware is attestable in a simple and effective manner.

In various examples there is a method of enabling an attestable update of a firmware layer that provides a unique identity of a computing device. The method comprises using an immutable firmware layer to access a unique device secret. The immutable layer is used to derive a hardware device identity (HDI) from the unique device secret. The immutable layer is used to derive a compound device identity (CDI) from a measurement of the firmware layer, which provides the unique identity, and the unique device secret. The CDI and HDI are made available to the firmware layer. The firmware layer computes and issues a local certificate to endorse a device identity key, derived from the CDI, the local certificate signed by a key derived from the HDI. In this way a local certificate is issued by the firmware layer and is useable by a verifier to verify the firmware update. In contrast to the measurement of the firmware layer which is updated, the HDI remains constant despite the firmware layer update. The HDI is used to derive a key and the key is used to sign the local certificate.

The immutable firmware layer and the firmware layer which is updated operate together in an unconventional manner to achieve the ability to attest to the updated firmware layer.

The immutable firmware layer and the firmware layer which is updated together improve the functioning of the underlying computing device by generating and using the HDI in order to enable a local certificate to be generated to attest to the updated firmware layer.

Figure 2:
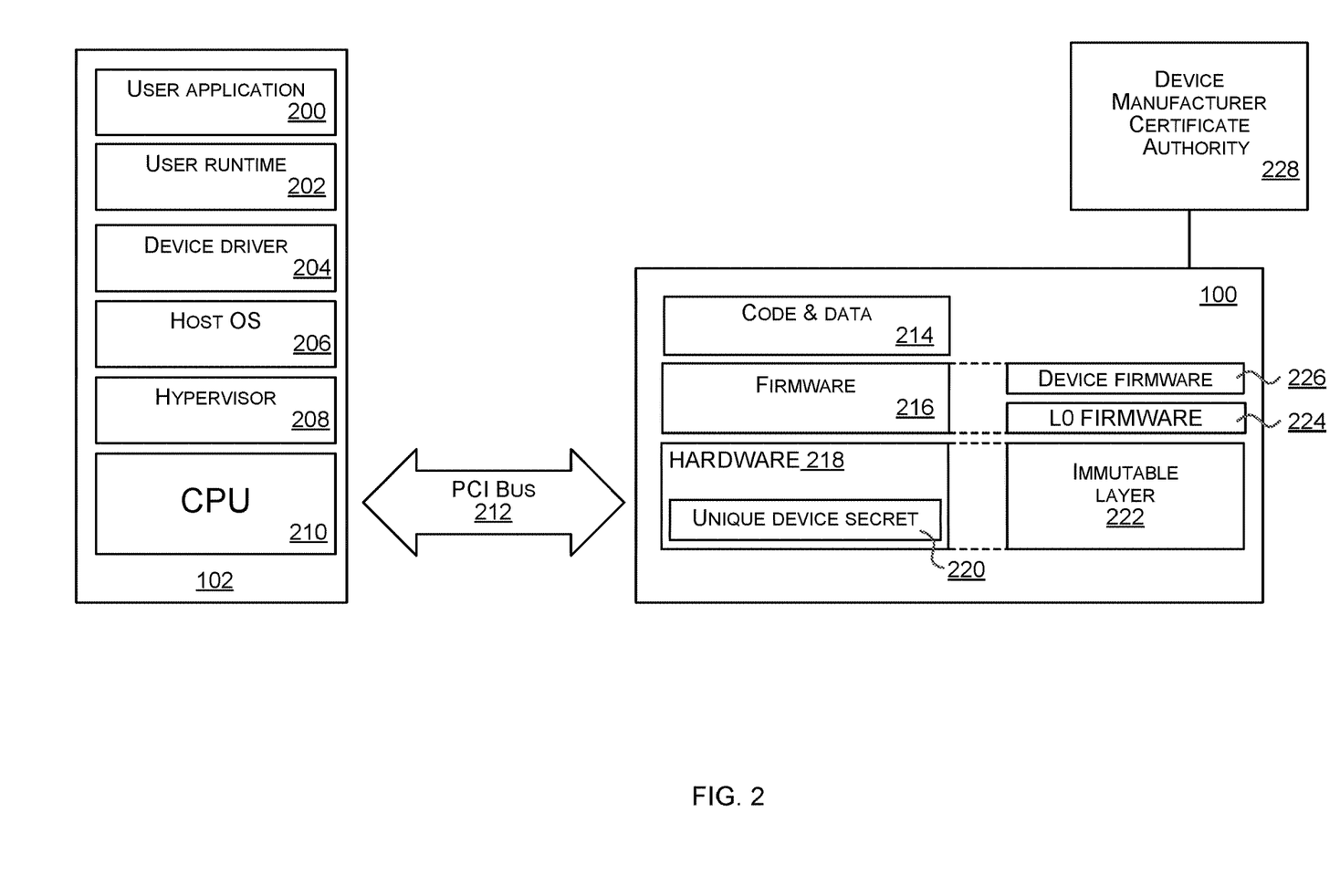
FIG. 2 is a schematic diagram of a host and a peripheral device and showing a unique device secret, and firmware.

FIG. 2 shows a CPU 210 of a host computing device 102. The host computing device 102 has a software stack comprising a hypervisor 208, host operating system 206, peripheral device driver 204, a user runtime process 202 and a user application 200. The host computing device is connected to a peripheral device 100 via a peripheral component interconnect bus 212. A non-exhaustive list of examples of types of peripheral device is: graphics processing unit, field-programmable gate array (FPGA), application-specific integrated circuit, cryptographic accelerator, video processing unit, regular expression accelerator, data compression accelerator, artificial intelligence accelerator and others.

The peripheral device 100 has a software stack comprising firmware 216 and code and data 214. The hardware of the peripheral device (represented as region 218 in FIG. 2) has burnt into it a unique device secret 220. The unique device secret is provisioned into the hardware during manufacturing. The unique device secret is either generated within the peripheral device from a high entropy source or is provisioned externally.

An immutable firmware layer 222 is installed on the peripheral device as indicated schematically in FIG. 2. Higher firmware layers of the peripheral device comprise a firmware layer providing device identity 224 and device firmware 226 as indicated schematically in FIG. 2.

FIG. 2 also shows a device manufacturer certificate authority 228 which is a computing entity accessible via a communications network and which is able to generate and issue digital certificates. The digital certificates are made available to the owner of the peripheral devices and are available to various services via a certificate cache service.

In one embodiment where the peripheral device 100 complies with the Trusted Computing Group's DICE standard, the immutable firmware layer 222 of firmware implements the DICE layer and the firmware layer providing the device identity implements a RIoT core as now explained with reference to FIG. 3.

Figure 3:
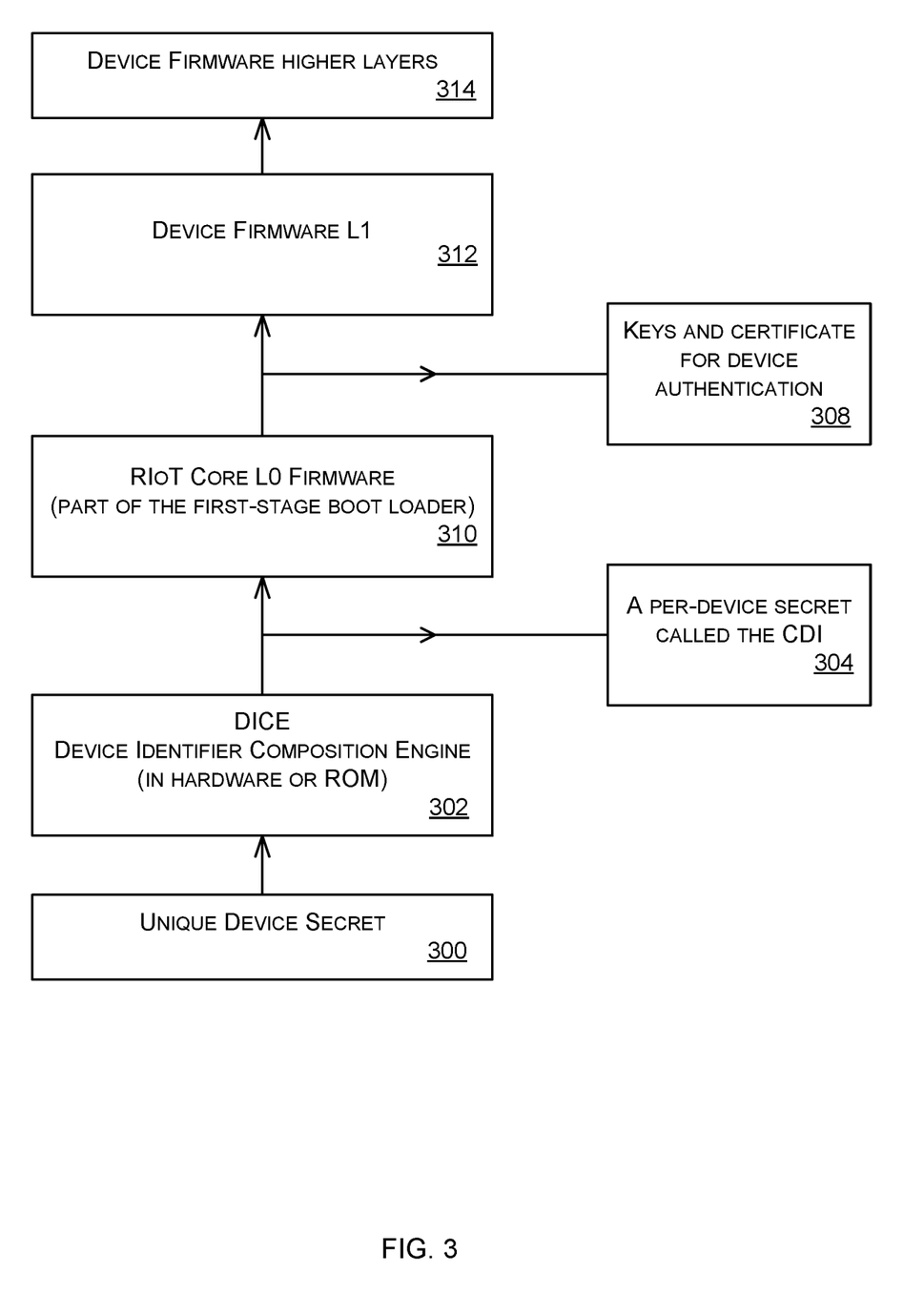
FIG. 3 is a schematic diagram of a device identifier composition engine and layers of firmware.

FIG. 3 is a schematic diagram of a device identifier composition engine 302 and layers of firmware on a computing device such as the peripheral device of FIGS. 1 and 2. Burnt into the device hardware is a unique device secret 300. The DICE 302 is deployed in hardware or ROM of the computing device and has access to the unique device secret 300. The DICE is able to compute and issue a per-device secret called the compound device identity CDI 304. Immediately above the DICE is a layer of firmware referred to as L0 firmware and also referred to as the RIoT core 310. The L0 firmware provides a unique device identity of the computing device as it computes and issues keys and certificates 308 for device authentication. Immediately above the L0 firmware is L1 device firmware 312 and there are zero or more higher layers of device firmware 314 above the L1 device firmware.

Figure 4:
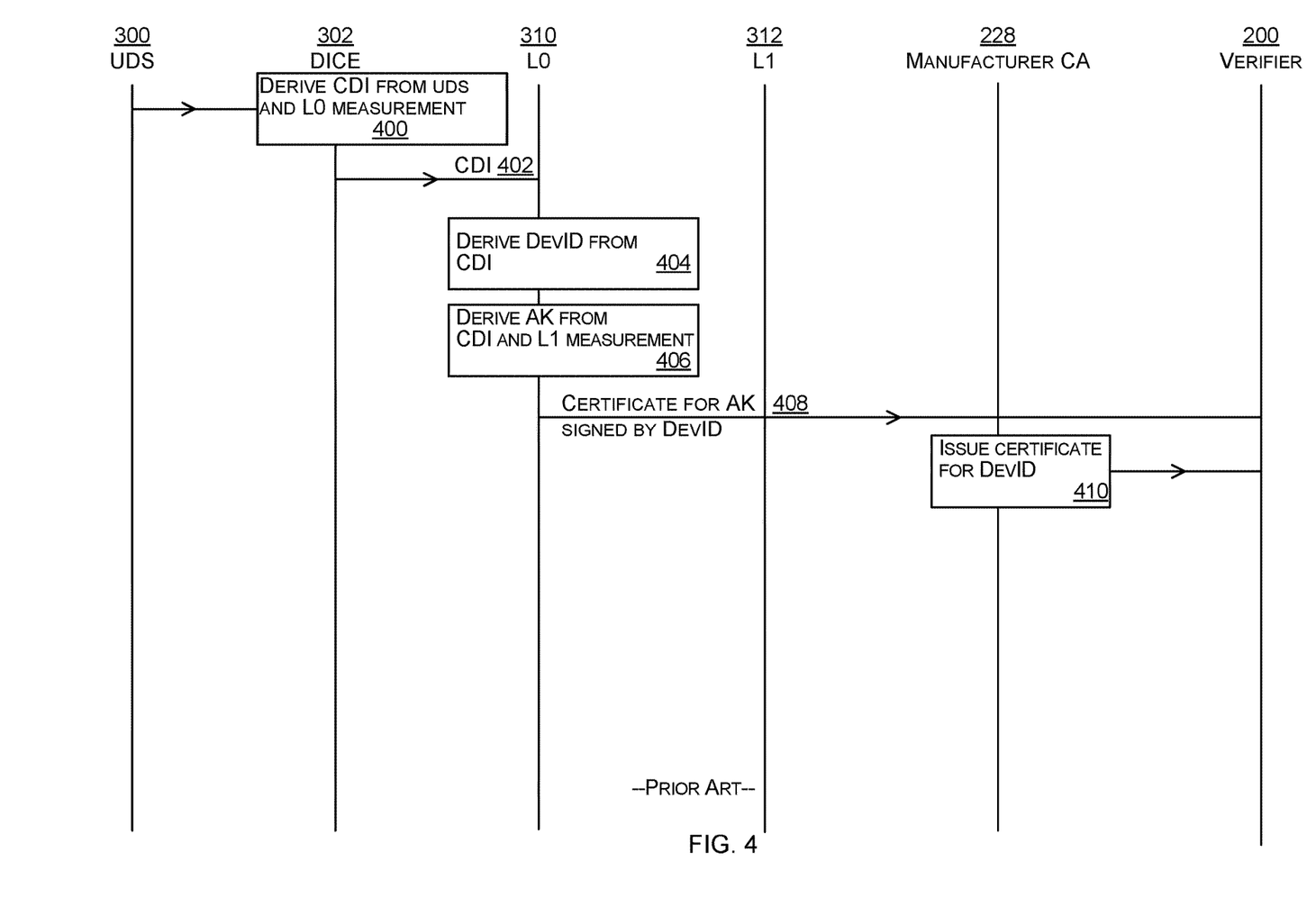
FIG. 4 is a schematic diagram of a method of attesting a firmware layer which is incompatible with an update to the firmware layer.

FIG. 4 is a sequence chart of a method of attesting a firmware layer. The method of FIG. 4 cannot be used where the firmware layer L0 is updated. The method of FIG. 4 illustrates a problem that the present technology seeks to overcome. Individual vertical lines are used in FIG. 4 to represent each of the unique device secret 300, the DICE 302, the L0 firmware 310, the L1 firmware 312, the manufacturer's certification authority 228 and a verifier 200. Horizontal lines in FIG. 4 represent messages sent between the entities represented by the vertical lines and arrow on the horizontal lines represent the directions the messages are sent. The relative vertical position of the horizontal lines in FIG. 4 represents a chronological order in which the messages are sent.

As illustrated in FIG. 4 there is a DICE 302 of a computing device configured to use the Trusted Computing Group's DICE standard. When the computing device comes out of reset, control transfers to the DICE which is immutable. The DICE authenticates the L0 firmware using a public firmware signing key embedded in DICE as a constant. The DICE 302 derives 400 a CDI from the unique device secret (UDS) 300. The CDI is expressed mathematically as:

$$CDI = KDF[UDS](HASH(L0))$$

Where $KDF[x](l)$ is a key derivation which computes a key using x as the key and l as the salt. Any suitable key derivation function is used. The above equation is expressed in words as, a compound device identity key is computed using a key derivation function which takes as arguments the unique device secret and a hash of a measurement of the level L0 firmware layer.

After deriving CDI, DICE removes access to the unique device secret until the next boot cycle using a hardware mechanism such as a latch.

The DICE 302 sends (or makes available) the CDI to the L0 firmware 310 using message 402.

The L0 firmware receives CDI from DICE and optionally authenticates the next layer of firmware L1 312.

The L0 firmware derives 404 a device identity key referred to as DevID from the CDI. The L0 firmware derives 406 an attestation key (AK) from the CDI and an L1 measurement which is a measurement of the level L1 firmware.

$$DevID_{priv}, DevID_{pub} = asym\_keygen(KDF[CDI]("Identity"))$$

$$AK_{priv}, AK_{pub} = asym\_keygen(KDF[CDI](HASH(L1)("Attestation")))$$

Any suitable asymmetric key generation function is used. The above equations are expressed in words as: the private and public parts of the device identity public-private key pair are computed using an asymmetric key generation function given as argument, the result of the key derivation function applied to the compound device identity and a salt denoted "Identity" which is a label string. And, the attestation public-private key pair is computed using the asymmetric key generation function given as argument, the result of the key derivation function applied to the compound device identity and a salt which is a hash of a measurement of the level L1 firmware layer concatenated with a label string "Attestation".

The L0 firmware generates an attestation certificate for the AK and signs it using the private DevID. The attestation certificate is sent 408 to the verifier 200. The level L0 firmware generates a self-signed certificate signing request (CSR) for DevID. The CSR is sent by the L0 firmware to the manufacturer's certificate authority. In response, the manufacturer's certificate authority 228 issues a certificate for the DevID and makes it available 410 to the verifier 200.

Before transferring control to firmware layer L1, the L0 firmware layer erases the secrets CDI and DevIDpriv and copies the public keys, signature and measurements of L0 and L1 to an area of memory accessible to L1.

In the process of FIG. 4 if there is a change to firmware layer L0 because of a firmware upgrade, then the attestation key AK becomes out of date since it was based on a measurement of the L0 firmware layer.

Figure 5:
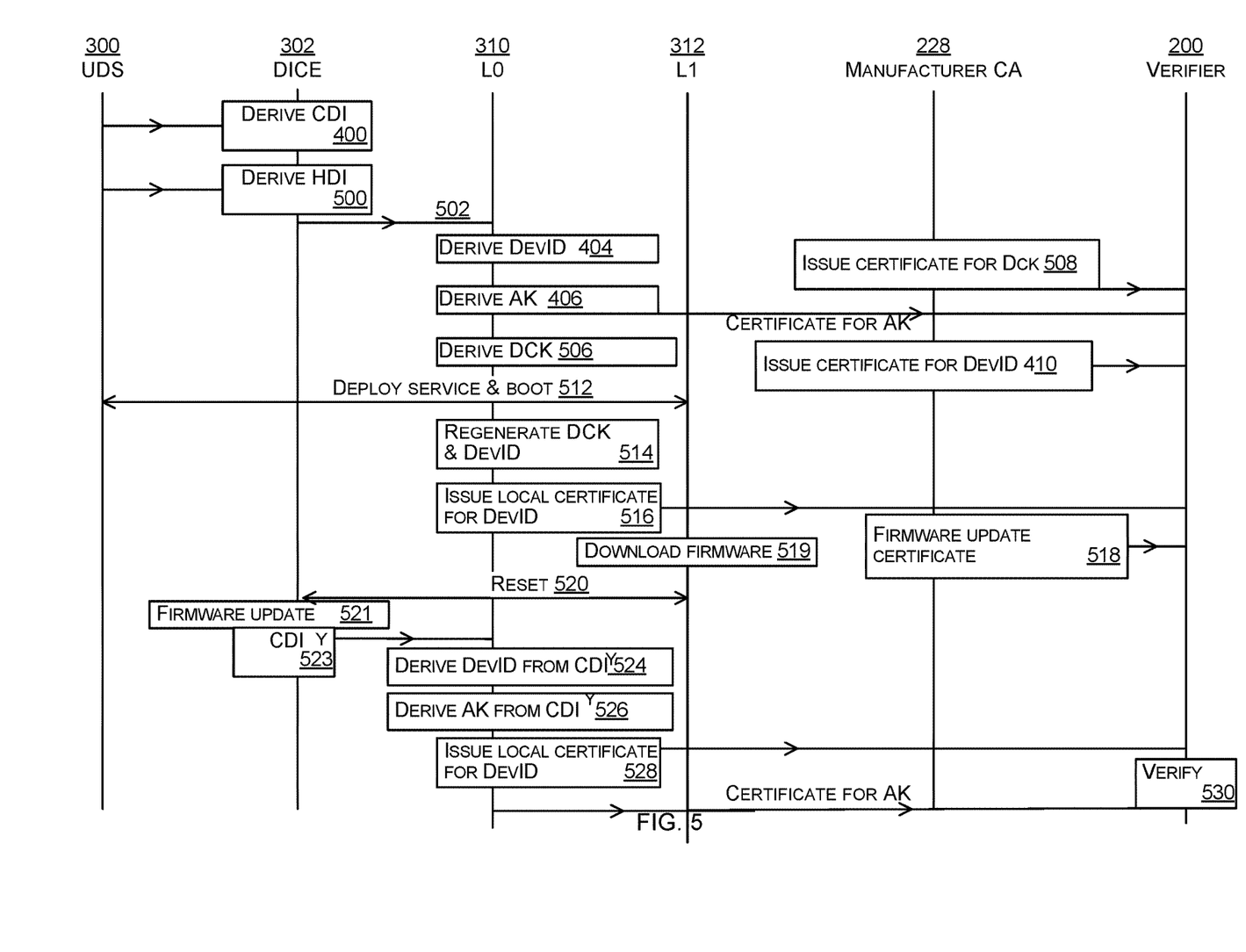
FIG. 5 is a schematic diagram of another method of attesting a firmware layer which is compatible with an update to the firmware layer.

FIG. 5 is a schematic diagram of another method of attesting a firmware layer which is compatible with an update to the firmware layer. In FIG. 5 the vertical lines are given the same reference numerals as for FIG. 4. But note that DICE 302 can be any immutable firmware layer which has access to the unique device secret.

When the computing device comes out of reset, control transfers to the DICE 302 which is immutable. The DICE authenticates the L0 firmware using a public firmware signing key embedded in DICE as a constant. The DICE 302 derives 400 a CDI from the unique device secret (UDS) 300. The CDI is expressed mathematically as given above for FIG. 4.

The DICE 302 sends (or makes available) the CDI to the L0 firmware 310. In an example the CDI and HDI are passed to L0 (indicated by 502 in FIG. 5) by writing them to a pre-defined static random-access memory (SRAM) location before transferring control to the L1 firmware.

The DICE 302 derives 500 an additional secret referred to herein as Hardware Device Identity (HDI) from the unique device secret 300 which is not salted by measurement of the L0 firmware layer 310. The DICE 302 sends or otherwise makes available, the HDI to the L0 firmware layer 310 such as using message 502. Generation of the HDI is expressed mathematically as follows:

$$HDI=KDF[UDS]("DeviceCA")$$

which is expressed in words as the hardware device identity is derived using the key derivation function taking as arguments the unique device secret and a label string "DeviceCA" as a salt which is NOT a measurement of the L0 firmware. The DICE 302 sends (or makes available) the HDI to the L0 firmware 310 such as using message 502.

The L0 firmware derives 404 a device identity key referred to as DevID from the CDI and a measurement of the L0 firmware as follows.

$$DevID_{priv}, DevID_{pub}=asym\_keygen(KDF[CDI]("Identity"))$$

Which is expressed in words as the private and public parts of the device identity public-private key pair are computed using an asymmetric key generation function given as argument, the result of the key derivation function applied to the compound device identity and a label string "Identity" as a salt to the KDF.

The L0 firmware derives 406 an attestation key (AK) from the CDI and an L1 measurement which is a measurement of the level L1 firmware. An AK certificate is sent to the verifier.

The L0 firmware derives an additional key referred to as a device certificate authority key (DCK) 506 from HDI as follows:

$$DCK_{priv}, DCK_{pub}=asym\_keygen(KDF[HDI]("DeviceCA"))$$

Which is expressed in words as, a device certificate authority public private key pair is derived by using an asymmetric key generation function which takes as argument the result of a key derivation function applied to the hardware device key and a label string "DeviceCA" as a salt to the KDF.

The DCK is shared by all authenticated versions of L0 and used to sign a certificate endorsing L0-specific DevID. The DCK acts as a certificate authority local to the device.

Before deploying the device, the manufacturer harvests CSRs for public DCK and DevID keys from the device, and issues certificates for both keys. The firmware on the device exposes certificate signing requests (CSRs) to the certificate authority. Hence FIG. 5 shows the manufacturer certificate authority 228 issuing a certificate for the DCK at operation 508 and issuing a certificate for the DevID at operation 410. The operation 410 is when the DevID Key certificate authority issues and signs the DevID Key certificate.

The device is deployed at operation 512 in FIG. 5. On boot the L0 firmware layer 310 of the device regenerates a DCK and a DevID at operation 514. The L0 firmware also issues a local certificate for the DevID at operation 516. The local certificate for the DevID is signed by the DCK.

Before updating the L0 firmware the manufacturer issues a firmware update certificate at operation 518. The firmware update certificate captures measurements of the new version of the L0 firmware layer and versions of the L0 firmware layer that are no longer certifiable.

A firmware update of either L0 or L1 is performed as follows.

L1 312 downloads 519 new firmware from a host computing device of the peripheral via a set of commands.

L1 writes the new firmware in a download slot in flash memory, sets a FW_UPDATE flag, and issues a reset 520.

The immutable layer 302 is designed to check the FW_UPDATE flag when it boots. When the flag is set, the immutable layer 302 will first authenticate and then copy the new firmware (only if the authentication succeeds) from the download slot to an active slot, and proceeds with the measured boot sequence of FIG. 5.

Thus the firmware update is activated by the DICE layer at operation 521 of FIG. 5. After activating the firmware update the DICE 302 generates a new CDI from the unique device secret. The new CDI is denoted $CDI^Y$ at operation 523 of FIG. 5. The updated L0 firmware layer generates identity and attestation keys specific to the new version of the L0 firmware as follows:

The L0 firmware derives 526 an attestation key (AK) from $CDI^Y$ and the L0 measurement as follows. The L0 firmware derives 524 a device identity key from $CDI^Y$ as follows.

$$DevID_{priv}^Y, DevID_{pub}^Y=asym\_keygen(KDF[CDI^Y](("Identity"))$$

$$AK_{priv}^Y AK_{pub}^Y,=asym\_keygen(KDF[CDI^Y](HASH(L1))$$

Which is expressed in words as the device identity public private key pair is computed using the asymmetric key generation function given as argument, the result of the key derivation function applied to the compound device identity and with a label string "Identity" used as a salt to the KDF.

The equation for the attestation key is expressed in words as the attestation public-private key pair is computed using the asymmetric key generation function given as argument, the result of the key derivation function applied to the compound device identity and a salt which is a concatenation of a measurement of the L1 firmware and a label string "Attestation".

The L0 firmware generates 528 a local certificate for the DevID. The local certificate is sent to the verifier 200. The L0 firmware also sends a certificate for the attestation key derived at operation 526 to the verifier 200.

Before transferring control to firmware layer L1, the L0 firmware layer erases the secrets CDI and HDI and copies the public keys, signed certificates and measurements of L0 and L1 to an area of memory accessible to L1.

The verifier 200 carries out verification 530 using a combination of the firmware update certificate from operation 518, the local certificate for the DevID from operation 528 and the original certificates from operations 508 and 410 to check there is a valid certificate chain in place. The DevID certificate includes the L0 firmware identity i.e. the L0 firmware measurement. To verify that the new DevID certificates are issued by a device specific DCK rooted to the DCK certificate certification authority, a check is made that the new and old firmware measurement in the firmware update certificate match the firmware measurement included in the new and original DevID certificates, and consequently the rest of the certificate chain rooted at the DevID certificate. If the certificate chain is complete the verifier knows that the firmware layer L0 has been updated correctly. If the certificate chain is incomplete the verifier knows to stop using the device as the L0 firmware layer is incorrect.

Figure 6:
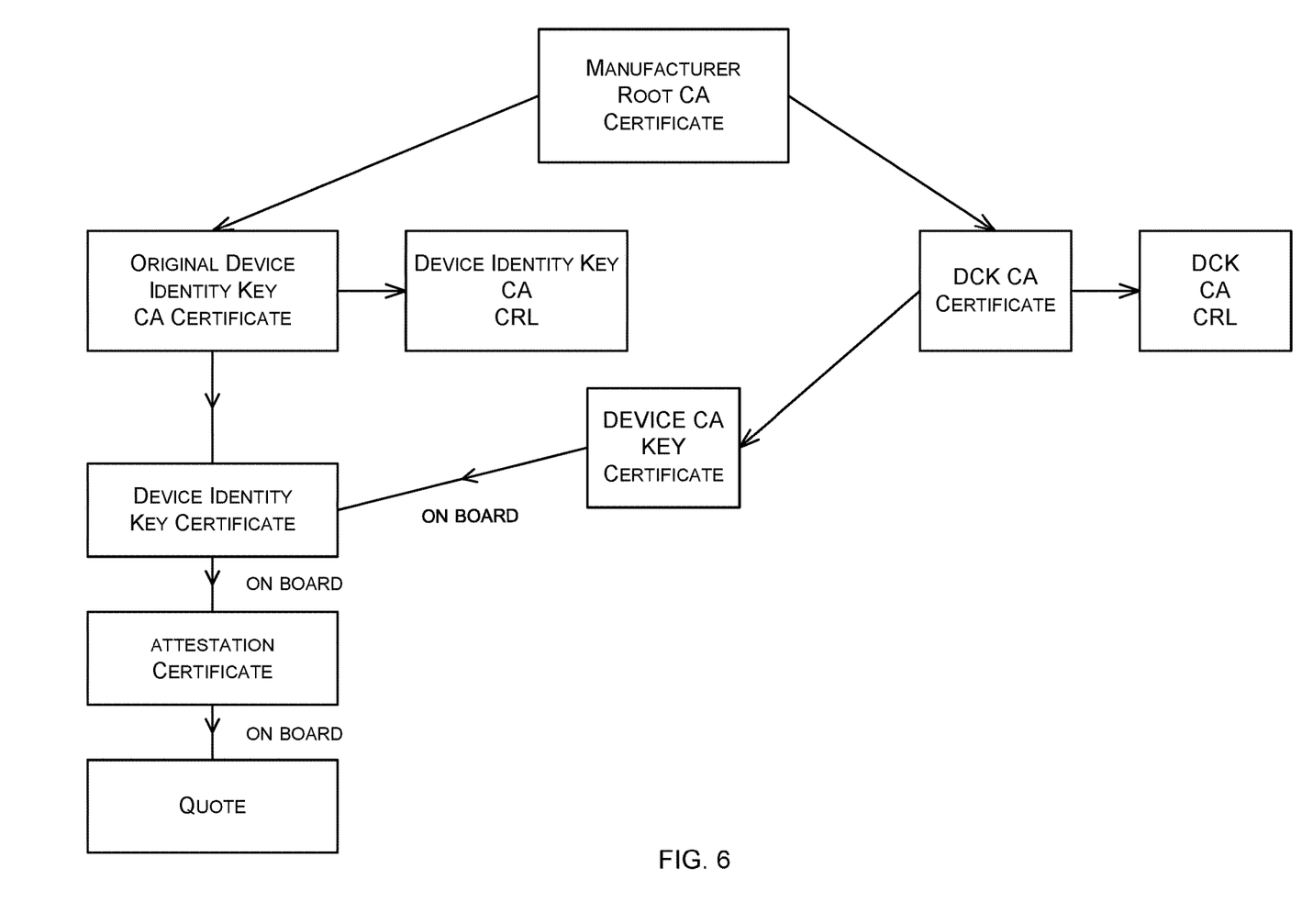
FIG. 6 is a schematic diagram of a certificate chain.

FIG. 6 shows an example certificate chain that the verifier 200 checks for. The root of the certificate chain is a manufacturer root certificate (referred to as a Root CA). The root has two branches. Using the root CA a DevID Key CA certificate is issued as indicated by one branch to an original device identity key certification authority certificate (DevID Key CA certificate). FIG. 6 shows a certificate revocation list CRL which is a list of certificates that have been revoked by the issuing certificate authority. The CRL is connected to the DevID Key CA certificate.

The second branch from the root goes to a DCK certificate authority certificate which is the certificate of operation 508 of FIG. 5. A certificate revocation list CRL for DCK certificates is connected to the DCK certificate authority certificate.

The use of the DCK to sign the local device identity certificate is indicated by the arrow joining the two branches that goes via a box denoting the Device CA Key Certificate. The operations 516 and 528 both involve the use of the DCK to sign the local device identity certificate. The certificate chain continues with an attestation certificate which is a child of the device identity key certificate which was signed by the DCK. The attestation certificate is the certificate that is signed using the DevID and endorses the Attestation Key derived in the operation 526. The Attestation Key is used by the L1 firmware to sign a Quote. The quote is the leaf certificate (final certificate) issued by the L1 firmware and contains information about the configuration of the accelerator device and the execution of the workload. The existence of attestation key allows to sign quotes without exposing the DevID to the L1 firmware. This way if the L1 is compromised by a bug, it is upgraded into a new version without the bug, and receives a different attestation key (because the L0 derives it from CDI using the L1 measurement).

An L1 firmware update is optionally applied at any point without the need for any additional certification from the manufacturer. When a device boots with a new version of L1 firmware, it generates a new attestation key AK with a signature over the public AK along with a hash of L1 using $DevID_{pub}$. Quotes generated by the updated version of L1 firmware are validated as long as a valid certificate endorsing $DevID_{pub}$ is available.

The immutable firmware layer is used to update a L1 firmware layer which is a firmware layer immediately above the L0 firmware layer. During boot of the computing device after updating the L1 firmware layer, the device generates an attestation private-public key pair and a certificate comprising the public part of the attestation key and the hash of the L1 firmware layer signed using the private part of the device identity key.

Alternatively or in addition to the other examples described herein, examples include any combination of the following:

Clause A. A method of enabling an attestable update of a firmware layer that provides a unique identity of a computing device the method comprising: using an immutable firmware layer to access a unique device secret;
  using the immutable layer to derive a hardware device identity (HDI) from the unique device secret;
  using the immutable layer to derive a compound device identity (CDI) from a measurement of the firmware layer and the unique device secret;
  making the compound device identity CDI and HDI available to the firmware layer;
  using the firmware layer to issue a local certificate to endorse a device identity key, derived from the CDI, the local certificate signed by a key derived from the HDI. In this way it is possible to update the firmware, such as to fix a bug or for an upgrade, and be able to attest the firmware update in an effective and secure manner. The firmware update is more secure and much simpler to deploy compared to alternative protocols, which either require the manufacturer to retain device keys, or consider more parts of the firmware as immutable.

Clause B. The method of clause A wherein the key derived from the HDI is a device certificate authority key DCK and wherein the method comprises deriving the DCK using an asymmetric key generation function applied to a public private key pair, where the public private key pair is the result of a key derivation function applied to the HDI.

Clause C The method of clause B comprising sending a certificate signing request CSR to a certificate authority of a manufacturer of the device for a public part of the DCK.

Clause D The method of any preceding clause comprising sending a certificate signing request to a certificate authority of a manufacturer of the device for a public part of the device identity key.

Clause E The method of any preceding clause comprising updating the firmware layer and then using the immutable firmware layer to generate a new CDI.

Clause F The method of any preceding clause further comprising, at a verifier, verifying the update of the firmware layer using:
  the local certificate;
  an update certificate of the firmware update; and
  a pair of original certificates previously issued for the device identity key and the key derived from the HDI by the certificate authority of the manufacturer of the device. The key derived from the HDI by the certificate authority of the manufacturer of the device is referred to as a device certificate authority key.

Clause G The method of any preceding clause wherein the immutable layer implements a Device Identifier Composition Engine and additional functionality.

Clause H The method of any preceding clause wherein the attestable update is of a firmware layer that implements a RIoT core.

Clause I The method of any preceding clause wherein the method comprises using the immutable firmware layer to update a L1 firmware layer which is a firmware layer immediately above the L0 firmware layer.

Clause J The method of clause I wherein the method comprises, during boot of the computing device after updating the L1 firmware layer, generating an attestation private-public key pair and a certificate comprising the public part of the attestation key and the hash of the L1 firmware layer signed using the private part of the device identity key.

Clause K A computing device comprising:
an immutable firmware layer;
a unique device secret burnt into hardware of the computing device;
a firmware layer, denoted L0, that provides a unique identity of the computing device;
wherein the firmware layers are configured to enable an attestable update of the firmware layer L0 as a result of the firmware layers comprising instructions which when executed on the computing device cause:
the immutable firmware layer to access the unique device secret;
the immutable firmware layer to derive a hardware device identity HDI from the unique device secret;
the immutable firmware layer to derive a compound device identity CDI from a measurement of the firmware layer L0 and the unique device secret;
the immutable firmware layer to make the CDI and HDI available to the firmware layer;
the firmware layer L0 to issue a local certificate to endorse a device identity key, derived from the CDI, the local certificate signed by a key derived from the HDI.

Clause L The computing device of clause K which is a peripheral selected from any of: a graphics processing unit, field-programmable gate array, application-specific integrated circuit, cryptographic accelerator, video processing unit, regular expression accelerator, data compression accelerator, artificial intelligence accelerator or other device used to complement a central processing unit.

Clause M The computing device of clause K or L wherein the key derived from the HDI is a device certificate authority key DCK and wherein the firmware derives the DCK using an asymmetric key generation function applied to key material where the key material is the result of a key derivation function applied to the HDI.

Clause N The computing device of any of clauses K to M wherein the firmware is configured to send a certificate signing request CSR to a certificate authority of a manufacturer of the device for a public part of the DCK.

Clause O The computing device of any of clauses K to N wherein the firmware is configured to send a certificate signing request to a certificate authority of a manufacturer of the device for a public part of the device identity key.

Clause P The computing device of any of clauses K to O wherein the firmware is configured to update the firmware layer L0 and then use the immutable firmware layer to generate a new CDI.

Clause Q The computing device of clause P wherein the firmware is configured to use the new CDI to derive a new device identity key using an asymmetric key generation function applied to key material where the key material is the result of a key derivation function applied to the new CDI and salted with a label string.

Clause R The computing device of clause P or Q comprising an L1 firmware layer which is a firmware layer immediately above the L0 firmware layer.

Clause S The computing device of clause R wherein the L0 firmware layer and the immutable firmware layer are configured to enable an attestable firmware update of the L1 firmware layer without requesting additional certification from a certification authority of a manufacturer of the computing device.

Clause T A peripheral computing device comprising: an immutable firmware layer;
a unique device secret burnt into hardware of the computing device;
a mutable firmware layer;
the immutable firmware layer configured to derive a hardware device identity (HDI) from the unique device secret;
the immutable firmware layer configured to derive a compound device identity from a measurement of the mutable firmware layer and the unique device secret;
the immutable firmware layer configured to make the compound device identity CDI and HDI available to the mutable firmware layer;
the mutable firmware layer configured to issue a local certificate to endorse a device identity key, derived from the CDI, the local certificate signed by a key derived from the HDI.

The term 'computer' or 'computing-based device' is used herein to refer to any device with processing capability such that it executes instructions. Those skilled in the art will realize that such processing capabilities are incorporated into many different devices and therefore the terms 'computer' and 'computing-based device' each include personal computers (PCs), servers, mobile telephones (including smart phones), tablet computers, set-top boxes, media players, games consoles, personal digital assistants, wearable computers, and many other devices.

The methods described herein are performed, in some examples, by software in machine readable form on a tangible storage medium e.g. in the form of a computer program comprising computer program code means adapted to perform all the operations of one or more of the methods described herein when the program is run on a computer and where the computer program may be embodied on a computer readable medium. The software is suitable for execution on a parallel processor or a serial processor such that the method operations may be carried out in any suitable order, or simultaneously.

This acknowledges that software is a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions are optionally distributed across a network. For example, a remote computer is able to store an example of the process described as software. A local or terminal computer is able to access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a digital signal processor (DSP), programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The operations of the methods described herein may be carried out in any suitable order, or simultaneously where appropriate. Additionally, individual blocks may be deleted from any of the methods without departing from the scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the scope of this specification.

What is claimed is:

1. A method comprising:
   accessing, using immutable firmware, a unique device secret of a computing device;
   deriving, using the immutable firmware, a hardware device identity (HDI) from the unique device secret using a key derivation function taking as arguments a label string as a salt and the unique device secret;
   deriving, using the immutable firmware, a compound device identity (CDI) from a measurement of mutable firmware and the unique device secret, the immutable firmware being deployed in hardware or read only memory (ROM) of the computing device, the mutable firmware being deployed in a layer of firmware (L0 firmware) immediately above the immutable firmware;
   deriving, using the mutable firmware, a device identity key (DevID) from the CDI, the DevID being separate and distinct from the HDI;
   deriving, using the mutable firmware, a device certificate authority key (DCK) from the HDI; and
   issuing, using the mutable firmware, a local certificate to endorse the DevID, wherein the local certificate is signed by the DCK.

2. The method of claim 1, wherein the key derivation function is a first key derivation function and the DCK is derived using an asymmetric key generation function applied to a public private key pair, and wherein the public private key pair is a result of a second key derivation function applied to the HDI.

3. The method of claim 1, comprising sending a certificate signing request (CSR) to a certificate authority of a manufacturer of the computing device for a public part of the DCK.

4. The method of claim 1, comprising sending a certificate signing request to a certificate authority of a manufacturer of the computing device for a public part of the DevID.

5. The method of claim 1, further comprising:
   activating, using the immutable firmware, a firmware update; and
   generating, using the immutable firmware, a new CDI.

6. The method of claim 1, further comprising, at a verifier, verifying an attestable update of the mutable firmware using the local certificate, an update certificate of the attestable update, and a pair of original certificates previously issued by a certificate authority of a manufacturer of the computing device, the pair of original certificates comprising a certificate for the DevID and a certificate for the DCK.

7. The method of claim 1, further comprising updating, using the immutable firmware, a layer of firmware (L1 firmware) immediately above the L0 firmware.

8. The method of claim 7, further comprising, after updating the L1 firmware, deriving, using the mutable firmware, an attestation private-public key pair and a certificate, the certificate comprising a public part of the attestation private-public key pair and a hash of the L1 firmware signed using a private part of the DevID.

9. The method of claim 1, wherein the immutable firmware includes Device Identifier Composition Engine (DICE) firmware.

10. The method of claim 1, wherein the mutable firmware includes Robust Internet of Things (RIOT) firmware.

11. A computing device comprising:
    a hardware processor; and
    a computer readable medium storing programming for execution by the processor, wherein the programming includes instructions which when executed by the processor cause the processor to:
    access, using immutable firmware, a unique device secret of the computing device;
    derive, using the immutable firmware, a hardware device identity (HDI) from the unique device secret using a key derivation function taking as arguments a label string as a salt and the unique device secret;
    derive, using the immutable firmware, a compound device identity (CDI) from a measurement of mutable firmware and the unique device secret, the immutable firmware being deployed in hardware or read only memory (ROM) of the computing device, the mutable firmware being deployed in a layer of firmware (L0 firmware) immediately above the immutable firmware;
    derive, using the mutable firmware, a device identity key (DevID) from the CDI, the DevID being separate and distinct from the HDI;
    derive, using the mutable firmware, a device certificate authority key (DCK) from the HDI; and issue, using the mutable firmware, a local certificate to endorse the DevID, wherein the local certificate is signed by the DCK.

12. The computing device of claim 11, wherein the key derivation function is a first key derivation function and the DCK is derived using an asymmetric key generation function applied to a public private key pair, and wherein the public private key pair is a result of a second key derivation function applied to the HDI.

13. The computing device of claim 11, wherein the programming further includes instructions to send a certificate signing request (CSR) to a certificate authority of a manufacturer of the computing device for a public part of the DCK.

14. The computing device of claim 11, wherein the programming further includes instructions to send a certificate signing request to a certificate authority of a manufacturer of the computing device for a public part of the DevID.

15. The computing device of claim 11, wherein the programming further includes instructions to update, using the immutable firmware, a layer of firmware (L1 firmware) immediately above the L0 firmware.

16. The computing device of claim 15, wherein the programming further includes instructions to, after updating the L1 firmware, derive, using the mutable firmware, an attestation private-public key pair and a certificate, the certificate comprising a public part of the attestation private-public key pair and a hash of the L1 firmware signed using a private part of the DevID.

17. The computing device of claim 11, wherein the immutable firmware includes Device Identifier Composition Engine (DICE) firmware.

18. A peripheral computing device comprising:
a unique device secret burnt into hardware of the peripheral computing device;
immutable firmware deployed in hardware or read only memory (ROM) of the peripheral computing device;
mutable firmware deployed in a layer of firmware (L0 firmware) immediately above the immutable firmware; and
wherein the immutable firmware is configured to access a unique device secret of the peripheral computing device, to derive a hardware device identity (HDI) from the unique device secret using a key derivation function taking as arguments a label string as a salt and the unique device secret, and to derive a compound device identity (CDI) from a measurement of the mutable firmware and the unique device secret, and
wherein the mutable firmware is configured to derive a device identity key (DevID) from the CDI, to derive a device certificate authority key (DCK) from the HDI, and to issue a local certificate to endorse the DevID, the DevID being separate and distinct from the HDI, and the local certificate being signed by the DCK.

19. The peripheral computing device of claim 18, wherein the immutable firmware is configured to update a layer of firmware (L1 firmware) immediately above the L0 firmware.

20. The peripheral computing device of claim 18, wherein the immutable firmware includes Device Identifier Composition Engine (DICE) firmware, and wherein the mutable firmware includes Robust Internet of Things (RIOT) firmware.

* * * * *